(12) United States Patent
Suthar et al.

(10) Patent No.: US 9,343,895 B2
(45) Date of Patent: May 17, 2016

(54) PROTECTION RELAY FOR SENSITIVE EARTH FAULT PROTECTION

(71) Applicant: ABB TECHNOLOGY LTD, Zürich (CH)

(72) Inventors: Niraj Suthar, Gujarat (IN); Vishal H. Shah, Gujarat (IN); Priyank Desai, Gujarat (IN); Mohammed Y. Shafi, Rangareddy District (IN)

(73) Assignee: ABB TECHNOLOGY LTD, Zürich (CH)

(*) Notice: Subject to any disclaimer, the term of this patent is extended or adjusted under 35 U.S.C. 154(b) by 449 days.

(21) Appl. No.: 13/872,554

(22) Filed: Apr. 29, 2013

(65) Prior Publication Data

US 2013/0242441 A1 Sep. 19, 2013

Related U.S. Application Data

(63) Continuation of application No. PCT/IB2011/002524, filed on Oct. 21, 2011.

(30) Foreign Application Priority Data

Oct. 28, 2010 (IN) .............. 3213/CHE/2010

(51) Int. Cl.
*H02H 3/00* (2006.01)
*H02H 3/16* (2006.01)
*H02H 1/04* (2006.01)
*H02H 1/06* (2006.01)
*H02H 3/10* (2006.01)

(52) U.S. Cl.
CPC .............. *H02H 3/16* (2013.01); *H02H 1/043* (2013.01); *H02H 3/165* (2013.01); *H02H 1/063* (2013.01); *H02H 3/105* (2013.01)

(58) Field of Classification Search
CPC .......... H02H 3/16; H02H 1/043; H02H 3/165
See application file for complete search history.

(56) References Cited

U.S. PATENT DOCUMENTS 3,739,229 A * 6/1973 Moran .......................... 361/65
4,068,283 A 1/1978 Russell
(Continued)

FOREIGN PATENT DOCUMENTS

| DE | 3114213 A1 | 2/1982 |
|---|---|---|
| WO | WO 81/02496 A1 | 9/1981 |
| WO | WO 2009/101463 A1 | 8/2009 |

OTHER PUBLICATIONS

International Search Report (PCT/ISA/210) issued on Sep. 19, 2012, by the European Patent Office as the International Searching Authority for International Application No. PCT/IB2011/002524.

*Primary Examiner* — Thienvu Tran
*Assistant Examiner* — Tien Mai
(74) *Attorney, Agent, or Firm* — Buchanan Ingersoll & Rooney PC

(57) ABSTRACT

A protection feature is disclosed for a self powered protection relay having, for example, sensitive earth fault protection. Protection can be achieved in tandem with optimal power on trip time and with integrated logic for inrush discrimination. The self supplied protection relay can include a current processing module to measure and evaluate line current to generate a trip signal, and to suppress inrush current to block earth fault detection during an inrush condition and thereby increase sensitivity of fault detection.

8 Claims, 3 Drawing Sheets

(56) References Cited

U.S. PATENT DOCUMENTS

| | | | | |
|---|---|---|---|---|
| 4,402,028 A | * | 8/1983 | Udren | 367/36 |
| 2002/0011899 A1 | * | 1/2002 | Organvidez et al. | 330/207 P |
| 2004/0130839 A1 | * | 7/2004 | Bo | 361/92 |
| 2009/0154046 A1 | * | 6/2009 | Robinson et al. | 361/95 |
| 2011/0025515 A1 | | 2/2011 | Suthar et al. | |
| 2011/0241550 A1 | * | 10/2011 | Imam et al. | 315/119 |

\* cited by examiner

PROTECTION RELAY FOR SENSITIVE EARTH FAULT PROTECTION

RELATED APPLICATION

This application claims priority as a continuation application under 35 U.S.C. §120 to PCT/IB2011/002524, which was filed as an International Application on Oct. 21, 2011 designating the U.S., and which claims priority to Indian Application 3213/CHE/2010 filed in India on Oct. 28, 2010. The entire contents of these applications are hereby incorporated by reference in their entireties.

FIELD

The present disclosure relates to the field of electrical power distribution, such as the design of a protection feature in a self powered protection relay.

BACKGROUND

A protection relay, also referred to as an Intelligent Electronic Device (IED), is a microcontroller based intelligent electronic device with a basic function to protect electrical equipment by tripping a circuit breaker and interrupting a power line in case of over current or earth fault situations. The tripping signal on behalf of a trip coil or other actuator of the circuit breaker is generated by the protection relay, such as when the measured current in the line exceeds a nominal or preset value for a predefined time period. In certain situations such as Ring Main Unit (RMU) installations in urban areas, a self-supplied relay may, for example, be used. The self-supplied protection relay utilizes energy from the current sensing transformers to supply to the relay electronics circuit and the energy required to operate trip coils. The design of a self-supplied relay can have several constraints associated with it to ensure the measurements are accurate and sensitive. Also, special provisions can be included to make its circuitry efficient and optimized for power consumption. Some of these constraints and methods to generate power supply by controlled charging are disclosed in the WIPO publication WO 2009101463.

Inrush (e.g., current surge) can be observed during switching in large inductive loads such as a transformer, or an induction motor. In the field, the protection personnel set the earth fault settings on a higher side (or even double) so as to avoid any mal-operation because of inrush at load start up. They then reduce the settings to lower values once the load is under normal operation condition. This is only possible where point load (e.g., a single load like a motor or transformer) is being protected. The same may not be possible when a feeder is being protected. There could be different loads being switched in and out of the feeder and hence there could be multiple possibilities of inrush presence.

The exemplary values for 1 nominal (In) are 1A and 5A. An exemplary nominal current for illustration purposes for the relay described herein is taken as 1A. The exemplary range is 0.1 In to 20 In for an earth setting with an auxiliary powered relay. Even in such relays, it can be difficult to set relays for 0.1 In earth setting in field if they are not having inrush blocking protection. At places where inrush is evident and if relays are not having inrush protection and if the relay is set for the lower earth fault settings (e.g., of the order of 0.1 In), the relay generates a trip imagining an earth fault. This is however, not a true earth fault as an inrush is not a fault condition.

In such cases, it could be possible that a sensitive (lower) earth fault setting like 0.1 In is not used. The same is applicable to phase protection also. As a result, there are relays with a feature of automatic setting double the value for a limited time to avoid mal operation because of inrush.

Further, achieving the functionality for a self powered relay can be complicated. The self powered relays can involve minimum time and phase currents to get powered on. Also, the inrush detection can involve some additional time. With all these constraints it is desirable that a relay shall give trip within a desired minimum trip time if there is a genuine fault.

Further, the design of the relay should account for good current detection sensitivity. The sensitivity, here, refers to an ability to, for example, sense a minimum of earth fault leakage currents. Better sensitivity can help to identify possible major faults earlier.

High end or point load protection relays may have inrush protection as a built-in feature. However, implementation of inrush protection in the case of a self powered relay with sensitive earth fault protection would be a unique feature.

Accordingly, the present disclosure is directed to an efficient self-powered three phase non-directional overcurrent and earth-fault protection TED.

SUMMARY

Exemplary embodiments as disclosed herein are directed to a self powered protection relay for providing electrical protection in an electrical system by measurement of current in at least one phase line in a medium voltage power line, and generation of a trip signal on detection of an overcurrent and earth fault condition in the medium voltage power line to operate a circuit breaker for electrical protection, the self powered protection relay comprising: a power supply module for supplying power to the self powered protection relay from the at least one phase line that the self-powered relay is to measure for providing electrical protection in the electrical system; and a current processing module for measuring and evaluating current in at least one phase line to generate a trip signal, wherein the current processing module is configured to provide inrush current suppression to block detection of an earth fault condition during an inrush condition.

BRIEF DESCRIPTION OF THE DRAWINGS

Other features and advantages will become apparent to those skilled in the art upon reading the description of the preferred exemplary embodiments in conjunction with the accompanying drawings, wherein.

DETAILED DESCRIPTION

Figure 1:
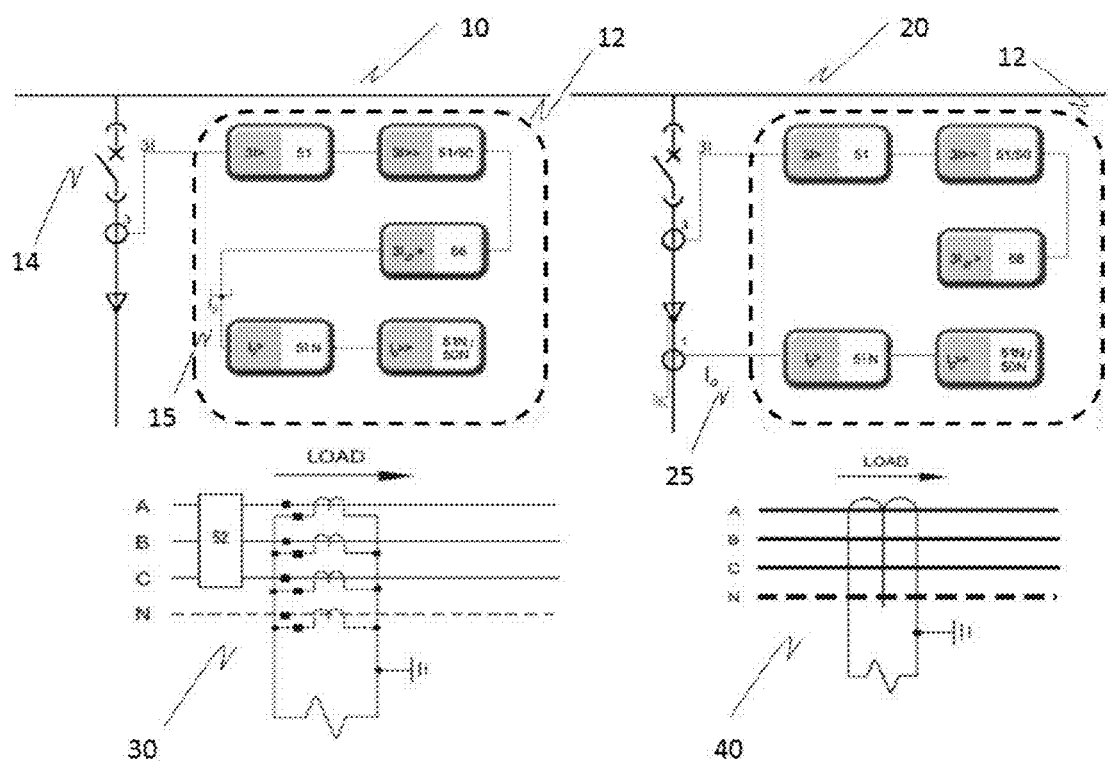
FIG. 1 provides configurations for the protection relay as per an exemplary embodiment disclosed herein.

Exemplary embodiments are disclosed which provide a self powered relay that offers sensitive earth fault protection. This protection can be achieved in tandem with optimal power on trip time (switching to fault) and with integrated logic for inrush discrimination.

In an exemplary aspect of the disclosure, a self powered protection relay for providing electrical protection in an electrical system is provided. The self supplied protection relay is powered on by line current of at least one phase line that it is measuring. To power on the self supplied relay and to have it fully operational, the relay involves a certain minimum current and time. During the power ON condition for the relay (e.g., during reset of fault condition) or when there is a load change, an inrush condition may result and in order to have the relay not generate a trip signal to trip the line, the threshold limits can be set high creating difficulty in providing sensitive earth fault detection. The self supplied protection relay can be provided with a current processing module adapted to measure and evaluate line current to generate a trip signal. The current processing module has an inrush current suppression to block earth fault detection during an inrush condition and thereby increase a sensitivity of fault detection.

In an exemplary embodiment, the self powered protection relay can be adapted to provide a wide operating range of for example 0.1 times the nominal current to 20 times the nominal current for protection setting, and can offer Definite Minimum Time (DMT) and Inverse Definite Minimum Time (IDMT) characteristics curve settings. In another exemplary embodiment, the relay is adapted to provide a selectable external and internal earth current measurement technique to provide earth fault protection.

In another exemplary embodiment, the relay performs harmonic analysis using Discrete Fourier Transform (DFT) techniques to automatically detect fundamental frequency and performs internal settings. The harmonic contents (e.g., for second harmonics) are also computed to use for computation of a harmonics factor to detect an inrush condition. The inrush condition detection can be provided as a firmware solution in the relay.

In another exemplary embodiment, the relay utilizes previous stored calibration factors for correcting phase current and earth current measurements obtained from a calibration procedure relating measured output values with the provided input in all the gain sections (e.g., gain sub ranges in an automatic gain control module) provided in the relay.

In yet another exemplary embodiment, inrush suppression logic in the relay is provided. The logic uses detection of exemplary conditions such as: a) current signal not being in a steady state condition; b) the value of current being more than approximately 10% of the current sensor nominal value; c) the value of current being below the preset fault threshold value; and d) the harmonic content in the current signal at the second harmonic as a ratio to the harmonic content at the fundamental frequency exceeds the preset harmonic ratio threshold, to detect inrush condition.

In an exemplary embodiment, the steady state condition can be detected based on any of the following exemplary conditions: a) the value of current at the fundamental frequency falls approximately below 10% of the current sensor nominal value; and b) the value of current at the fundamental frequency falls approximately in the range of 95% to 105% of the value of current at the fundamental frequency in a previous period when measured for at least one period.

Thus, an efficient self-powered three phase non-directional overcurrent and earth-fault protection IED is disclosed with various DMT and IDMT characteristics curves for configuration.

The self powered relays can derive their operating power from the very current transformers that are being used for the measurement. They do not have to use any auxiliary power to operate their electronics circuit. Therefore, self powered relays do involve minimum current to get fully powered on. The higher the current above a minimum required current, the lower will be the time for relay to get powered on. A higher current refers to more energy being available to power the relay.

The self powered relay can provide both earth fault protection and also inrush protection. The earth fault protection is provided in the manner depicted in FIG. 1. The relay 12, on the detection of a fault, trips the circuit breaker 14. The following configurations are provided by the relay 12:

1. Internal earth fault protection: In this configuration 10, the relay, 12 measures the earth current by soft calculation, 15. It measures the 3 phase currents with the residual current measurement arrangement 30 and their vector summation gives the earth current magnitude and phase.
2. Earth fault protection through dedicated earth fault CT: In this configuration 20, the relay, 12 has a connection, 25 for an external core balance CT (CBCT) used for earth fault detection with the arrangement 40. The CBCT magnetically senses the resultant of 3 phase currents that is nothing but the system earth current. This type of measurement may be preferred for more accurate and sensitive measurement.

The relay can have two stage low-set and high-set non-directional overcurrent and earth-fault protection stages. The relay supports Definite time (DMT) and inverse DMT (IDMT) characteristics for both phase and earth-fault protection. The operation of the low-set overcurrent stage I> and the low-set earth fault stage 10> is based on definite time or inverse time characteristics, as selected by the user. The high-set stage has instantaneous and definite time characteristics.

When an IDMT characteristic has been selected, the operating time of the stage will be a function of the current; the higher the current, the shorter the operating time. The stage includes seven time/current curve sets-four according to the BS 142 and IEC 60255 standards namely normal inverse, very inverse, extremely inverse and long time inverse and three special curves, name RI type curve, HR fuse curve and FR fuse curve.

The relay offers sensitive earth fault protection with wide operating range of for example 0.1 $I_{nominal}$ to 20 $I_{nominal}$, in both selectable external or internal vector summation earth current measuring techniques. The exemplary nominal value is 1 A in case of external earth and will be same as the overcurrent stage in case of internal earth selection. Earth fault protection can have both low-set and high-set stages with a wide settings range. The low-set stage is also available with selectable DMT/IDMT characteristics where along with four standard IDMT characteristics (e.g., NI, EI, VI and LI) it also has special characteristics such as RI, HR and FR, for better co-ordination within the electrical network. These protection stages can be made adaptive to the operating frequency of line inputs (e.g., range from 45 Hz to 65 Hz) by incorporating a frequency estimation algorithm.

A reliable protection can be achieved by incorporating better design of earth CT and employing an algorithm for curve fitting with a calibration process of earth CT characteristics. A challenge with the CT design can be the size against the desired dynamic faithful measurement range of for example 0.1A to 20A absolute at a given burden of 0.1VA. With respect to size to VA ratio, it is a difficult design. Precision can be desired with respect to CT performance at lower currents. All above this, sensitivity at lower points can be further improved and false tripping avoided by an inrush discrimination protection algorithm which utilizes fundamental and second harmonic component values measured by a DFT (Discrete Fourier Transform) algorithm. In a case of any inrush detection in phase, the earth protection gets blocked automatically. This can help in allowing system power on with sensitive earth fault protection settings.

Figure 2:
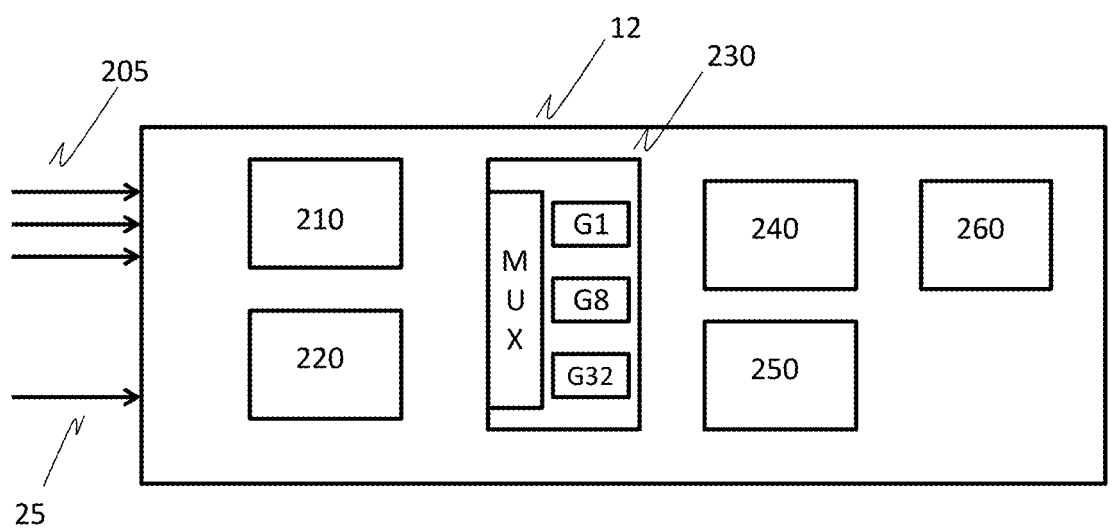
FIG. 2 provides a block diagram of exemplary components of the protection relay.

Exemplary components relevant for calibration from the block diagram of the relay are illustrated in FIG. 2. The relay has input terminals for interface to three phase line, 205 and earth line, 25 by using sensing CTs (not shown in this figure). As the relay is a self powered relay that extracts power from the 3 phase line currents for getting into operation fully, dynamic control of current flow (e.g., VBUS control) is desired and that is provided with controlled MOSFET Switching, 210 to power the relay without disturbing current measurement and effective charging of the power supply for the relay from the current in the line (e.g., minimize time). The relay has a controller 240 to perform software computation and manage operation of the relay. The other modules relevant for calibration are zero crossover sensing module, 220 and harmonic analyzer (not shown in the figure) using a DFT algorithm to provide automatic frequency detection and measurement of a current signal. Current evaluation module 250 is also depicted in the figure as it represents firmware used in the relay for operations involving processing of a current signal for measurement and protection. The gain control module 230 using multiplexer (Mux) and various amplifiers along with the output module 260 are depicted in the figure and these modules help selection of appropriate gain for measurement and also are operated in a calibration procedure.

The relay with its separate analog measurement channels for 3 phase and 1 earth currents provides phase and earth current measurement range (e.g. for earth current it is 0.1A to 20A absolute and for phase it is 75 mA to 6.5A absolute on the secondary side of the external current transformer) and to provide for this range, for better measurement, the range has been divided in to 3 sections (depicted in the gain control module 230 in FIG. 2) called the gain stages in the relay. Each gain stage helps to condition or scale a given current section into, for example, 0V to 3.3V. This is desired for accurate current measurement.

The relay is designed to have, for example, 3 gain stages called:
  Gain 1
  Gain 8 and
  Gain 32

Calibration is desired to eliminate or minimize measurement errors coming because of analog circuit components and quantization errors. Each of the gain stages forms a different analog circuit for a given analog channel. For example if we consider phase 1, it has 3 analog channel routes: one for gain 1, second for gain 8 and third for gain 32. It is therefore, desired that the relay gets calibrated for each phase and each of the gain stages.

So, in total there are for example 12 calibration constants identified during a calibration process for 3 phases plus 1 external earth channel.

In an exemplary calibration process, a reference signal at 50 Hz for each line, and currents at different gain stages are input to calibrate the system. For that it computes calibration factors and stores them in a nonvolatile memory (e.g., an EEPROM) provided in the relay.

Power on trip time is a term being used for any relay (auxiliary or self powered) when relays are being switched into a faulty system. The time taken by the relay to clear the fault when switched in (e.g., relay power "off" to "on" condition and protection function time set to minimum possible by relay) to faulty system is called the "power on trip time". Here, the optimal power on trip time refers to the minimum power on trip time for a given self powered relay. Design optimization can be made to minimize the power on trip time by having an efficient algorithm for measurement and protection and with a good balance between the hardware and firmware implementation of the features of the relay.

Figure 3:
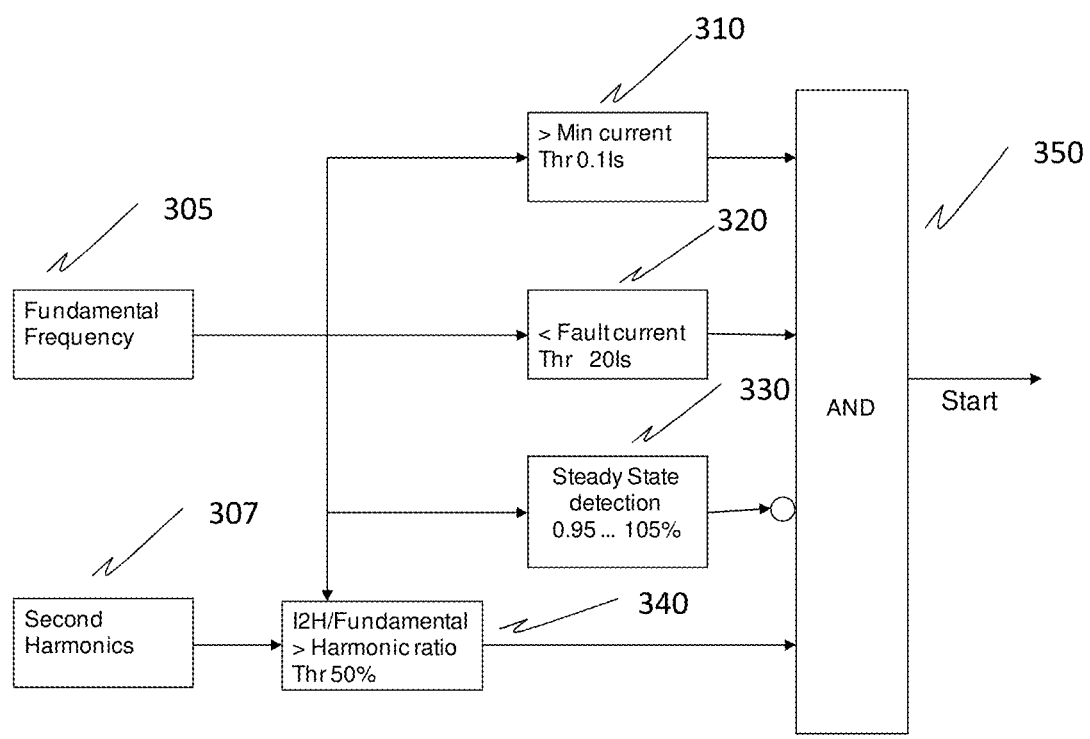
FIG. 3 provides an exemplary inrush suppression logic for earth current protection.

The power on trip time is minimal, also with the inrush suppression feature to provide sensitive earth fault protection. As an exemplary illustration of the design of this feature, the logic for inrush detection is depicted in FIG. 3 and the algorithm is as follows:

Exemplary Operation Criteria for Inrush Suppression
If for at least one phase current, a logical combination of the following parameters may be considered:
1. Current is not in steady-state condition, (steady state condition 330 is negated in the logic block 350)
AND
2. Current value at fundamental frequency is above 10% of sensor nominal value (i.e. min. current threshold), 310
AND
3. Current value is below the preset threshold (i.e. Fault current threshold), 320
AND
4. Harmonic ratio 340 between current values at $2^{nd}$ harmonic 307 and that at the fundamental frequency 305 exceeds the preset threshold (i.e. Harmonic ratio threshold), then the protection function is started; i.e., the trip signal is not blocked. It will remain in a start state until the above conditions remain true. The logic used here is that of the AND, depicted as a logical block 350 in FIG. 3, which specifies that all the factors stated are true, as illustrated as an example. It is to be noted that inrush protection may be implemented with other related factors as well, and can be combined together using other logical combinations. The above illustration in FIG. 3 and the algorithm are provided only as an exemplary case.

The algorithm for detection of the steady-state condition is based on detection of the following condition:
1. Current value at fundamental frequency falls below 10% of sensor nominal value
OR
2. Current value at fundamental frequency is between 95% and 105% of the previous period for at least one period.

The symbols/reference numbers used in an exemplary embodiment are:

| Protection | IEC | ANSI |
|---|---|---|
| Three phase overcurrent protection, low-set stage | 3I> | 51 |
| Three phase overcurrent protection, high-set stage | 3I>> | 50/51 |
| Earth-fault protection, low-set stage | $I_0$> | 51N |
| Earth-fault protection, high-set stage | $I_0$>> | 50N/51N |
| Three phase transformer inrush detector | $3I_{2f}$> | 68 |

The features described herein, though illustrated for self powered protection relays, are also applicable for protection relays including self powered relays provided with auxiliary power sources. The inrush suppression feature though illustrated for earth fault protection is also applicable for phase current fault or any other fault condition that involves inrush suppression for better performance.

While only certain features of the invention have been illustrated and described herein, many modifications and changes will occur to those skilled in the art. It is, therefore, to be understood that the appended claims are intended to cover all such modifications and changes as fall within the true spirit of the invention.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:

1. A self powered protection relay for providing electrical protection in an electrical system by measurement of current in at least one phase line in a medium voltage power line, and generation of a trip signal on detection of an overcurrent and earth fault condition in the medium voltage power line to operate a circuit breaker for electrical protection, the self powered protection relay comprising:
a power supply module for supplying power to the self powered protection relay from the at least one phase line that the self-powered relay is to measure for providing electrical protection in the electrical system; and
a current processing module for measuring and evaluating current in at least one phase line to generate a trip signal, wherein the current processing module is configured to provide inrush current suppression to block detection of an earth fault condition during an inrush condition,
wherein the current processing module determines an inrush condition in at least one phase line based on one or more states of: a) a current signal not being in a steady state condition; b) a value of current being more than approximately 10% of a current sensor nominal value; c) a value of current being below a preset fault threshold value; and d) a harmonic content in a current signal at a second harmonic as a ratio to harmonic content at a fundamental frequency exceeds a preset harmonic ratio threshold; and
wherein the current processing module is configured for determining the steady state condition based on one or more states of: a) a value of current at the fundamental frequency falls below approximately 10% of a current sensor nominal value; and b) a value of current at the fundamental frequency falls in a range of approximately 95% to 105% of a value of current at the fundamental frequency in a previous period when measured for at least one period.

2. The self powered protection relay according to claim 1, comprising:
a low threshold value setting for earth fault protection of approximately 0.1 times a nominal current.

3. The self powered protection relay according to claim 1, comprising:
fault protection in an operating range of approximately 0.1 times the nominal current to 20 times a nominal current.

4. The self powered protection relay according to claim 1, comprising:
a selectable external and internal earth current measurement technique to provide earth fault protection.

5. The self powered protection relay according to claim 1, comprising:
selectable Definite Minimum Time (DMT) and Inverse Definite Minimum Time (IDMT) characteristics for protection.

6. The self powered protection relay according to claim 1, wherein the current processing module automatically detects a medium voltage power line frequency from evaluation of current in at least one phase line.

7. The self powered protection relay according to claim 1, wherein an inrush condition detection is provided as a firmware in the self powered protection relay.

8. The self powered protection relay according to claim 1, wherein the current processing module provides measurement of current in the at least one phase line using stored calibration factors obtained from calibration procedures to relate measured current values with signals input for phase and external earth channels in the self powered protection relay.

* * * * *